US012576644B2

(12) United States Patent
Sunaga et al.

(10) Patent No.: US 12,576,644 B2
(45) Date of Patent: Mar. 17, 2026

(54) RECORDING DEVICE AND METHOD OF CONTROLLING RECORDING DEVICE

(71) Applicant: SEIKO EPSON CORPORATION, Tokyo (JP)

(72) Inventors: Yasuo Sunaga, Matsumoto (JP); Takeshi Aoki, Matsumoto (JP); Yusaku Amano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 18/456,421

(22) Filed: Aug. 25, 2023

(65) Prior Publication Data

US 2024/0066872 A1 Feb. 29, 2024

(30) Foreign Application Priority Data

Aug. 26, 2022 (JP) ................................ 2022-134961

(51) Int. Cl.
*B41J 2/165* (2006.01)

(52) U.S. Cl.
CPC .. *B41J 2/16526* (2013.01); *B41J 2002/16582* (2013.01)

(58) Field of Classification Search
None
See application file for complete search history.

(56) References Cited

U.S. PATENT DOCUMENTS 5,455,609 A * 10/1995 Gast .................... B41J 2/16547 74/89.17
5,867,185 A * 2/1999 Yun ..................... B41J 2/16547 347/29

FOREIGN PATENT DOCUMENTS

JP 2011-073229 A 4/2011

* cited by examiner

*Primary Examiner* — Alejandro Valencia
(74) *Attorney, Agent, or Firm* — WORKMAN NYDEGGER

(57) ABSTRACT

A recording device has: a recording section that discharges a liquid to a medium for recording purposes; a maintenance unit that abuts the recording section and performs maintenance of the recording section; a first moving section that causes the recording section to abut the maintenance unit and separates the recording section from the maintenance unit; and a restricting section that can suppress movement of the recording section toward the maintenance unit after the recording section abuts the maintenance unit. The first moving section has a driving source and a worm gear that transmits the power of the driving source. A force with which the driving source causes the recording section to abut the maintenance unit is smaller than a force with which the driving source separates the recording section from the maintenance unit.

10 Claims, 6 Drawing Sheets

RECORDING DEVICE AND METHOD OF CONTROLLING RECORDING DEVICE

The present application is based on, and claims priority from JP Application Serial Number 2022-134961, filed Aug. 26, 2022, the disclosure of which is hereby incorporated by reference herein in its entirety.

BACKGROUND

1. Technical Field

The present disclosure relates to a recording device such as a printer and to a method of controlling the recording device.

2. Related Art

An ink jet printer is an example of a recording device that discharges ink, which is, an example of a liquid, from a head, which is an example of a recording section, for recording purposes, as described in, for example, JP-A-2011-73229. The ink jet printer has a cap unit, which is an example of a maintenance unit.

When the cap unit comes into contact with the head, the cap unit forms a sealed space that covers a discharging port. The cap unit has an abutting projection protruding upward, the abutting projection being an example of a restricting section. When the abutting projection abuts the head from below, the cap unit is vertically positioned.

The recording unit and maintenance unit can be relatively moved with a worm gear. When, however, a force with which the recording unit and maintenance unit abut each other is great, the worm gear may cause a jam between the worm and the worm wheel. There is the fear that when the worm gear causes a jam, the recording section and maintenance unit cannot be separated from each other.

SUMMARY

To address the above problem, a recording device has: a recording section that discharges a liquid to a medium for recording purposes; a maintenance unit that abuts the recording section and performs maintenance of the recording section; a moving section that causes one of the recording section and the maintenance unit to abut the other of the recording section and the maintenance unit and separates the one from the other; and a restricting section that can suppress movement of the one toward the other after the recording section and the maintenance unit abut each other. The moving section has a driving source and a worm gear that transmits the power of the driving source. A force with which the driving source causes the one to abut the other is smaller than a force with which the driving source separates the one from the other.

To address the above problem, a method of controlling a recording device controls a recording device that has: a recording section that discharges a liquid to a medium for recording purposes; a maintenance unit that abuts the recording section and performs maintenance of the recording section; a moving section that causes one of the recording section and the maintenance unit to abut the other of the recording section and the maintenance unit and separates the one from the other; and a restricting section that can suppress movement of the one toward the other after the recording section and the maintenance unit abut each other. The moving section has a driving source and a worm gear that transmits the power of the driving source. The recording section having a nozzle section, from which a liquid is discharged. The maintenance unit has a maintenance section that performs maintenance of the nozzle section, and also has an urging section that urges the maintenance section toward the nozzle section. The method includes: moving the one in a direction toward the other until the load of the driving source reaches a predetermined value; setting, as a contact position, the position of the one at a time when the load of the driving source reaches the predetermined value; setting, as a target position, a position away from the contact position and toward the other by a first predetermined distance; and setting, as a first driving force, the force with which the one abuts the other, when the one can be moved to the confirmation position, which is away from the target position by a second predetermined distance and toward the other, by use of, as the first driving force, the driving force of the driving source. The first driving force is smaller than the driving force, of the driving source, with which the one separates from the other.

DESCRIPTION OF EMBODIMENTS

Embodiment

Figure 1:
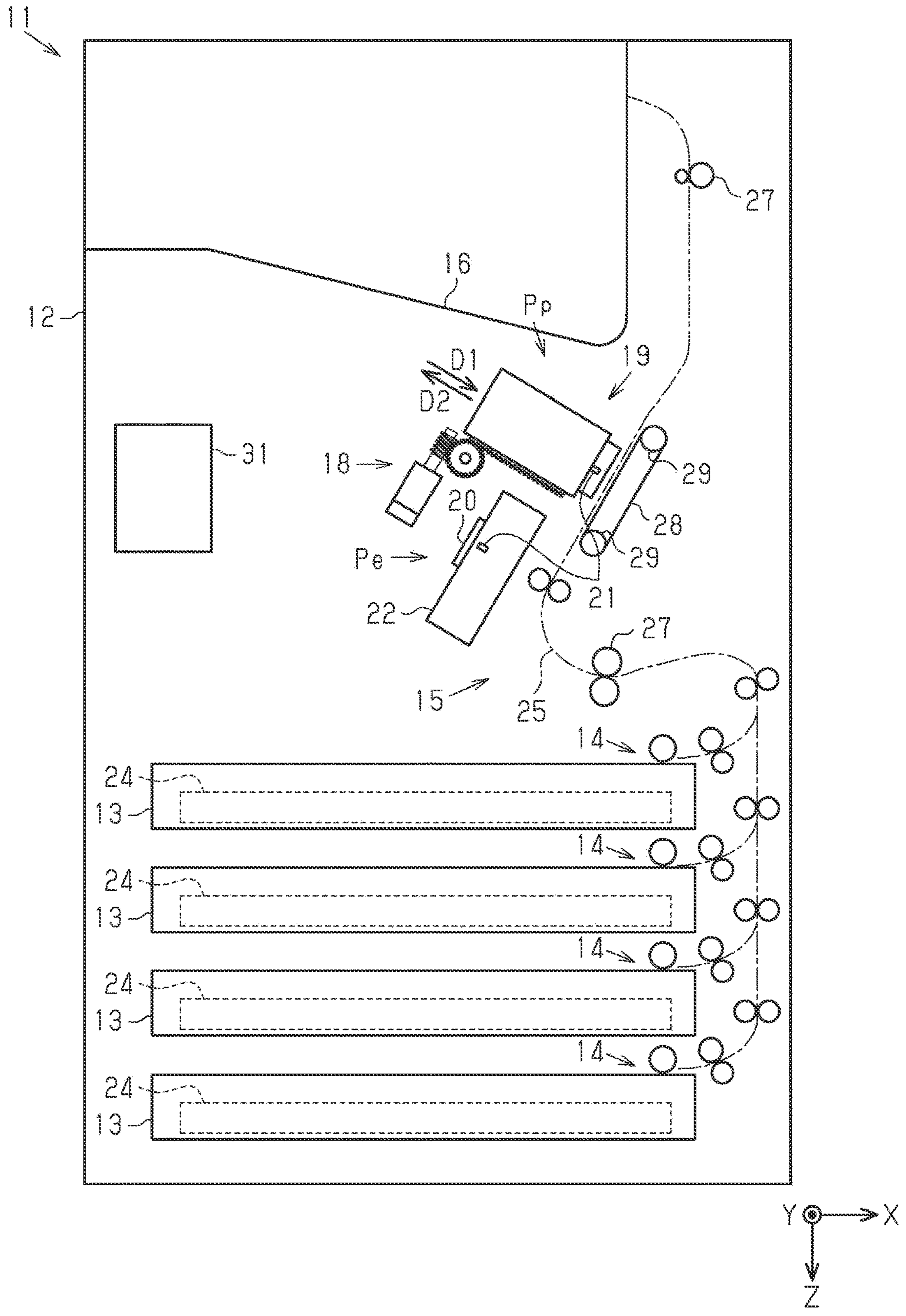
FIG. 1 is a schematic diagram illustrating an embodiment of a recording device.

An embodiment of a recording device and a method of controlling the recording device will be described with reference to the drawings. The recording device in this embodiment is an ink jet printer that discharges ink, which is an example of a liquid, to, for example, a sheet, a fabric, vinyl, a plastic part, a metal part, or another medium for recording purposes.

In the drawings, the direction of gravity is indicated by the Z axis and directions along a horizontal plane are indicated by the X axis and Y axis, assuming that the recording device 11 is placed on a horizontal plane. The X-axis, Y-axis, and Z-axis are mutually orthogonal. In the description below, a direction parallel to the Y-axis will also be referred to as a depth direction Y.

Recording Device

The recording device 11 may have a case 12, a medium storage section 13, a feeding section 14, a transport section 15, and a stacker 16, as illustrated in FIG. 1. The recording device 11 may have a plurality of medium storage sections 13 and as many feeding sections 14 as there are medium storage sections 13. The recording device 11 has a first moving section 18, which is an example of a moving section, a recording section 19, and a maintenance unit 20. The recording device 11 may have a restricting section 21 and a second moving section 22.

In FIG. 1, a transport path 25, through which a medium 24 is transported, is illustrated by dash-dot lines. The transport path 25 links the medium storage sections 13 and stacker 16 together. The stacker 16 accepts the medium 24 that has been transported.

The medium storage section 13 may be capable of storing a plurality of media 24 in a stack form.

The feeding section 14 feeds media 24 stored in the relevant medium storage section 13 from the medium storage section 13 to the transport path 25, one at a time.

The transport section 15 transports the medium 24 along the transport path 25. The transport section 15 may have a transport roller 27, a transport belt 28, which is an endless belt, and a pair of pulleys 29. The transport belt 28 is placed on the pair of pulleys 29. The transport section 15 may have a plurality of transport rollers 27. When the transport roller 27 is rotated with the medium 24 interposed between them, the medium 24 is transported. When the transport belt 28 is rotated with the medium 24 adhering to it, the medium 24 is transported. The transport section 15 ejects, to the stacker 16, the medium 24 that has been transported.

The recording device 11 may have a controller 31 that controls the first moving section 18. The controller 31 controls the driving of various mechanisms in the recording device 11 in a centralized manner, and also controls various operations executed in the recording device 11.

The controller 31 can be configured as one or more processors that execute various processing in response to computer programs, as one or more special hardware circuits that execute at least part of various types of processing, or as a circuit that includes a combination of the one or more processors and the one or more special hardware circuits. The hardware circuit is, for example, an application-specific integrated circuit. The processor includes a central processing unit (CPU) and memories such as a random-access memory (RAM) and read-only memory (ROM). A memory stores program code or commands configured so as to cause the CPU to execute processing. Memories, that is, computer-readable media, include all types of readable media accessible to general-purpose computers or special computers.

Figure 2:
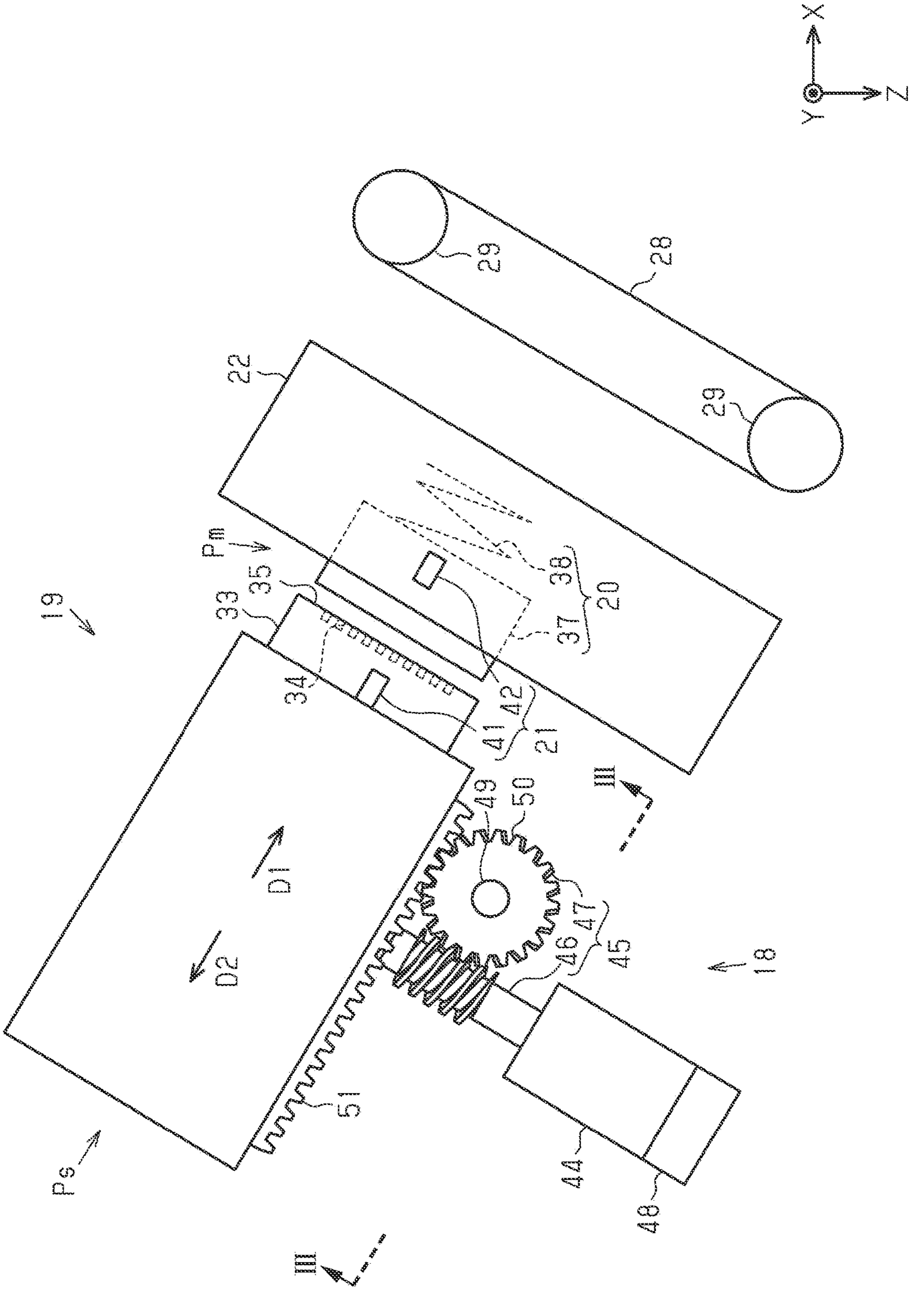
FIG. 2 is a schematic diagram illustrating a recording section and a maintenance unit.

As illustrated in FIG. 2, the recording section 19 may have a nozzle section 33, from which a liquid is discharged. The nozzle section 33 may have a nozzle plane 35 in which nozzles 34 are open. The recording section 19 may be disposed so that the nozzle plane 35 is inclined with respect to a horizontal plane. The nozzle section 33 may discharge a liquid in a direction perpendicular to the nozzle plane 35. The recording section 19 performs recording by discharging a liquid to a medium 24. The recording section 19 in this embodiment is of a line type that discharges a liquid to a medium 24 to be transported in a state in which the medium 24 is stopping.

The recording section 19 may be movable between a print position Pp indicated in FIG. 1 and a separate position Ps indicated in FIG. 2. At the print position Pp, recording is performed on the medium 24. The separate position Ps is more distant from the transport belt 28 than the print position Pp.

The maintenance unit 20 abuts the recording section 19 and performs maintenance of the recording section 19. The maintenance unit 20 may have a maintenance section 37 and an urging section 38. The maintenance unit 20 may have a plurality of maintenance sections 37 and a plurality of urging sections 38.

The second moving section 22 moves the maintenance unit 20. The maintenance unit 20 may be movable between an escape position Pe indicated in FIG. 1 and a maintenance position Pm indicated in FIG. 2. The escape position Pe is outside the movable region of the recording section 19. When the maintenance unit 20 is positioned at the escape position Pe, the recording section 19 is movable between the print position Pp and the separate position Ps. When the maintenance unit 20 is positioned at the maintenance position Pm, the maintenance unit 20 performs maintenance of the recording section 19.

When the maintenance unit 20 is at the maintenance position Pm, the maintenance unit 20 is positioned between the transport belt 28 and the recording section 19 positioned at the separate position Ps. The maintenance section 37 may accept the liquid ejected from nozzles 34 during maintenance such as flushing or pressure cleaning in a state in which the maintenance section 37 is distant from the recording section 19.

The maintenance section 37 performs maintenance of the nozzle section 33. Specifically, when the recording section 19 moves from the separate position Ps in a first direction D1 and the maintenance section 37 at the maintenance position Pm abuts the recording section 19, the maintenance unit 20 performs capping for the recording section 19. Capping is maintenance in which a closed space is formed so as to cover the nozzles 34. Abutting is a state in which one member presses another member, and at the same time, the other member presses back the one member with the same force. That is, abutting is a state in which both members press each other.

The urging section 38 urges the maintenance section 37 toward the nozzle section 33. Urging is an action in which when a force is applied to a target, the target is pressed back. The urging section 38 is, for example, a spring. In a state in which the maintenance unit 20 is positioned at the maintenance position Pm, the urging section 38 presses the maintenance section 37 toward the nozzle section 33 from the side opposite to the nozzle section 33.

The restricting section 21 may have a first projection portion 41 and a second projection portion 42. The first projection portion 41 is included in the recording section 19. The first moving section 18 may move the first projection portion 41 together with the recording section 19. The second projection portion 42 is included in the maintenance unit 20. The second moving section 22 may move the second projection portion 42 together with the maintenance unit 20. While the first projection portion 41 is moving in the first direction D1, when the first projection portion 41 strikes the second projection portion 42 positioned at the maintenance position Pm, the restricting section 21 suppresses the movement of the recording section 19. The restricting section 21 may have a plurality of first projection portions 41 and a plurality of second projection portions 42.

Figure 3:
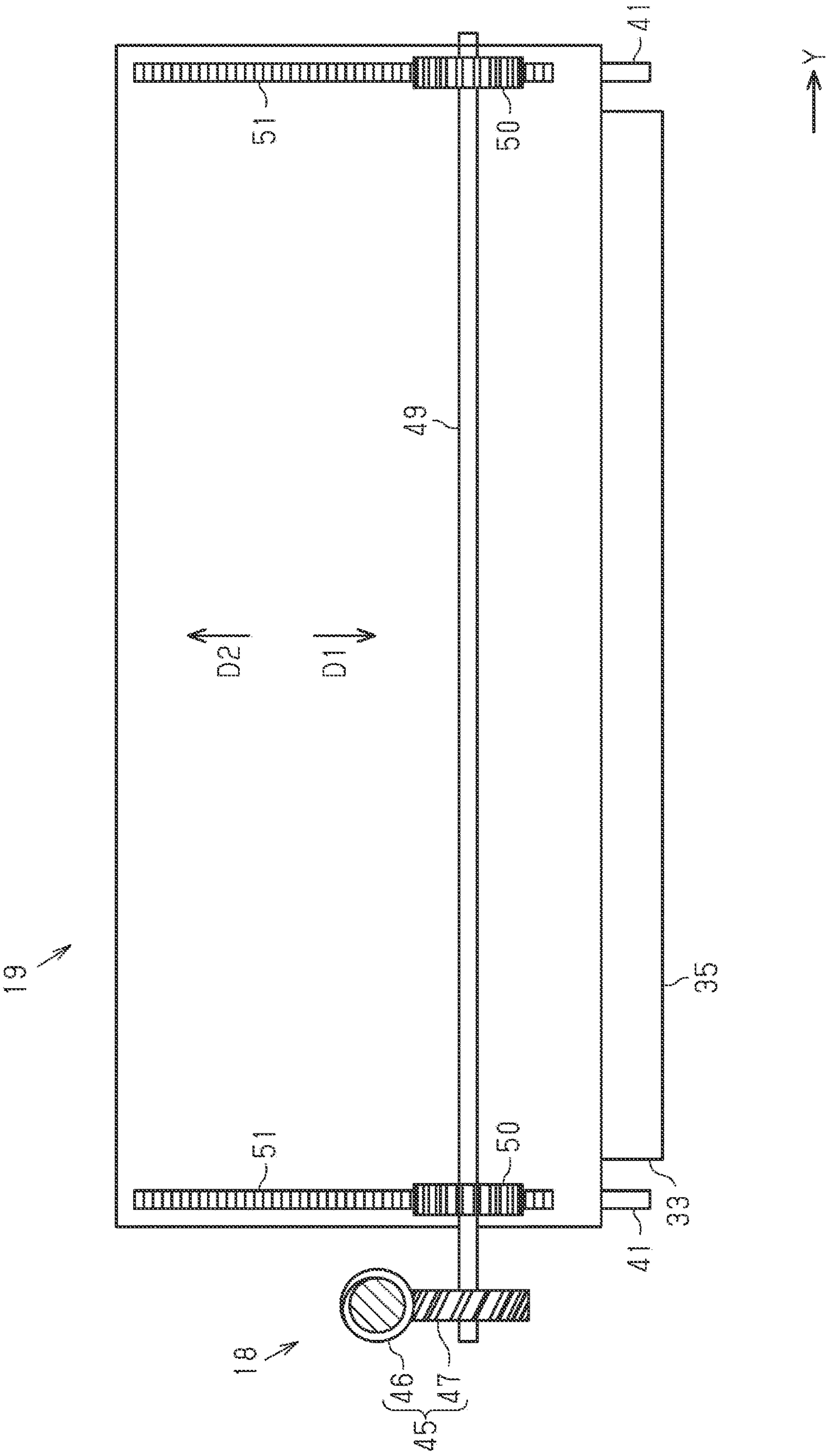
FIG. 3 is a sectional view taken along line III-III in FIG. 2.

The plurality of first projection portions 41 may be disposed on both sides of the nozzle section 33 in the depth direction Y, as illustrated in FIG. 3.

Figure 4:
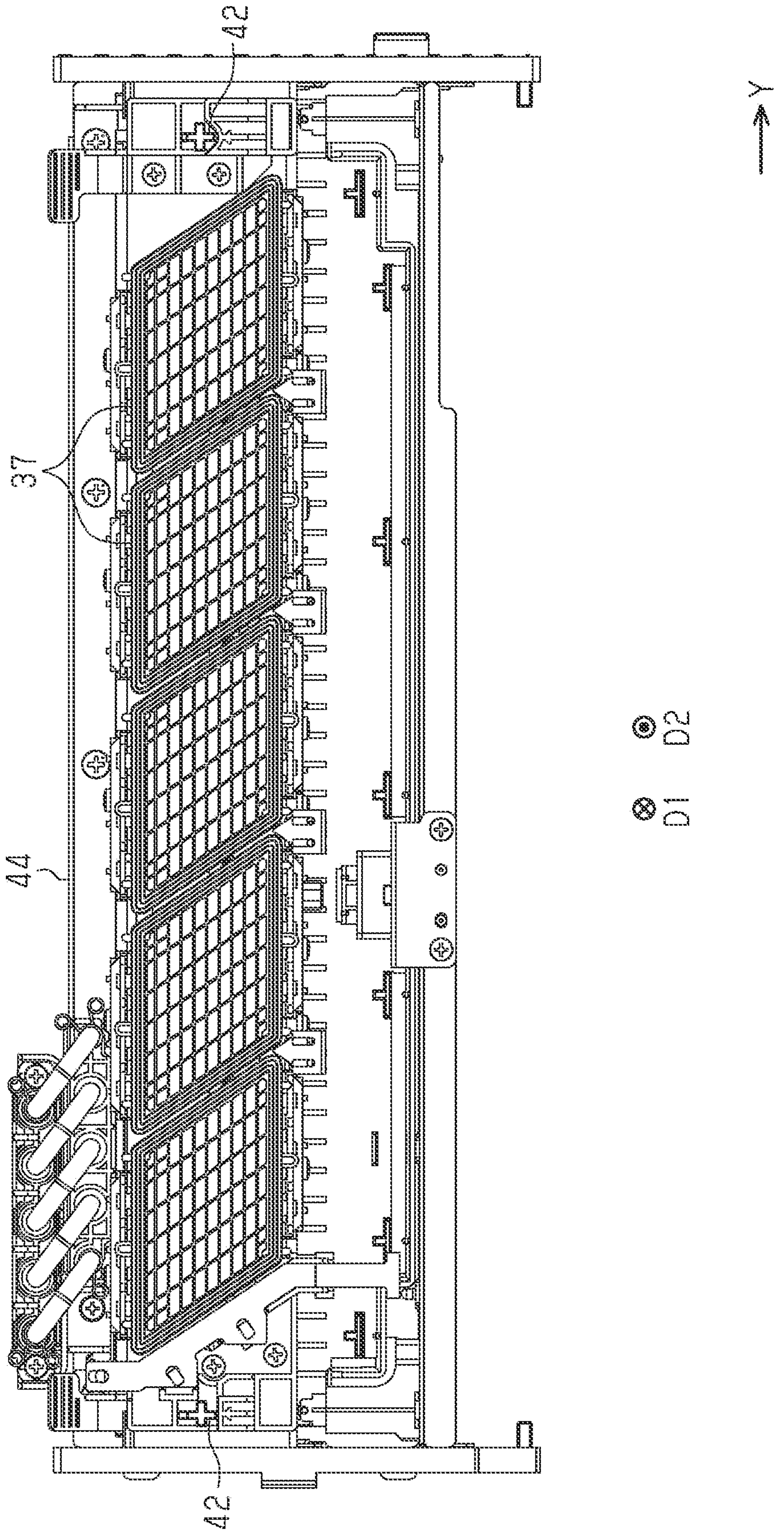
FIG. 4 is a plan view illustrating the maintenance section when viewed in a first direction.

The plurality of second projection portions 42 may be disposed on both sides of the maintenance sections 37 in the depth direction Y, as illustrated in FIG. 4.

In the first direction D1, the distance between the first projection portion 41 and the second projection portion 42 is longer than the distance between the nozzle plane 35 and the maintenance section 37, as illustrated in FIG. 2. When the recording section 19 moves in the first direction D1, therefore, the first projection portion 41 and second projection portion 42 abut each other after the nozzle plane 35 and maintenance section 37 abut each other. That is, after the recording section 19 and maintenance unit 20 abut each other, the restricting section 21 can suppress the movement of the recording section 19 toward the maintenance unit 20.

The first moving section 18 has a driving source 44 and a worm gear 45. The worm gear 45 has a worm 46 and a worm wheel 47. The first moving section 18 may have a rotary encoder 48, a driving shaft 49, a driving gear 50, and a rack 51. The driving source 44 is, for example, a mother that rotates the worm 46. The rotary encoder 48 may detects the number of revolutions of the driving source 44. The worm gear 45 transmits the power of the driving source 44. The amount of movement of the recording section 19 is proportional to the number of revolutions of the driving source 44.

The first moving section 18 may have a plurality of pairs of the driving gear 50 and rack 51, as illustrated in FIG. 3. The plurality of driving gears 50 may be fixed to the driving shaft 49 together with the worm wheel 47.

In abutting between the recording section 19 and the maintenance unit 20 and in their separation, the first moving section 18 causes the recording section 19 to abut the maintenance unit 20 and separates the recording section 19 from the maintenance unit 20, as illustrated in FIG. 2. Specifically, the first moving section 18 moves the recording section 19 in the first direction D1 and in a second direction D2. The first direction D1 is a direction in which the recording section 19 comes close to the transport belt 28. The second direction D2 is opposite to the first direction D1. Specifically, the second direction D2 is a direction in which the recording section 19 moves away from the transport belt 28. The first direction D1 and second direction D2 may be perpendicular to the nozzle plane 35. When the recording section 19 moves a curved guide (not illustrated), the first direction D1 and second direction D2 may be directions along the curved guide.

The first moving section 18 moves the recording section 19 in the first direction D1 by driving the driving source 44 in a normal direction. A driving force with which the driving source 44 is driven in the normal direction to cause the recording section 19 to abut the maintenance unit 20 is also referred to as an abutting driving force. The first moving section 18 moves the recording section 19 in the second direction D2 by driving the driving source 44 in a reverse direction. A driving force with which the driving source 44 is driven in the reverse direction to separate the recording section 19 from the maintenance unit 20 is also referred to as a separating driving force. The abutting driving force is smaller than the separating driving force. That is, the force with which the driving source 44 causes the recording section 19 to abut the maintenance unit 20 is smaller than the force with which the driving source 44 separates the recording section 19 from the maintenance unit 20.

The controller 31 may set forces with which the recording section 19 and maintenance unit 20 abut each other and separate from each other. The controller 31 may set these forces so that the force with which the driving source 44 causes the recording section 19 to abut the maintenance unit 20 is smaller than the force with which the driving source 44 separates the recording section 19 from the maintenance unit 20.

The force with which the recording section 19 and maintenance unit 20 abut each other may be adjusted by a torque. A torque with which the driving source 44 causes the recording section 19 to abut the maintenance unit 20 may be smaller than a torque with which the driving source 44 separates the recording section 19 from the maintenance unit 20. In other words, the torque with which the recording section 19 separates from the maintenance unit 20 may be greater than the torque with which the recording section 19 abuts the maintenance unit 20. The controller 31 may set the torque. The controller 31 may set the torque with which the recording section 19 and maintenance unit 20 abut each other. The controller 31 may set the torque with which the recording section 19 separates from the maintenance unit 20.

The force with which the recording section 19 and maintenance unit 20 abut each other may be adjusted by the value of a current in the driving source 44. The value of a current, in the driving source 44, with which the driving source 44 causes the recording section 19 to abut the maintenance unit 20 may be smaller than the value of a current, in the driving source 44, with which the driving source 44 separates the recording section 19 from the maintenance unit 20.

The controller 31 may set the values of these currents in the driving source 44. The controller 31 may set these values so that the value of the current, in the driving source 44, with which the driving source 44 causes the recording section 19 to abut the maintenance unit 20 is smaller than the value of the current, in the driving source 44, with which the driving source 44 separates the recording section 19 from the maintenance unit 20.

Adjustment Routine

Next, a method of controlling the recording device 11 will be described with reference to the flowcharts illustrated in FIGS. 5 and 6. The controller 31 executes an adjustment routine to set forces with which the recording section 19 and maintenance unit 20 abut each other and separate from each other. The controller 31 may executes the adjustment routine at a predetermined timing. That is, at a predetermined timing, the controller 31 may set a force with which the recording section 19 abuts the maintenance unit 20. The controller 31 may execute the adjustment routine when, for example, the recording device 11 is powered on for the first time or a part is replaced.

Figure 5:
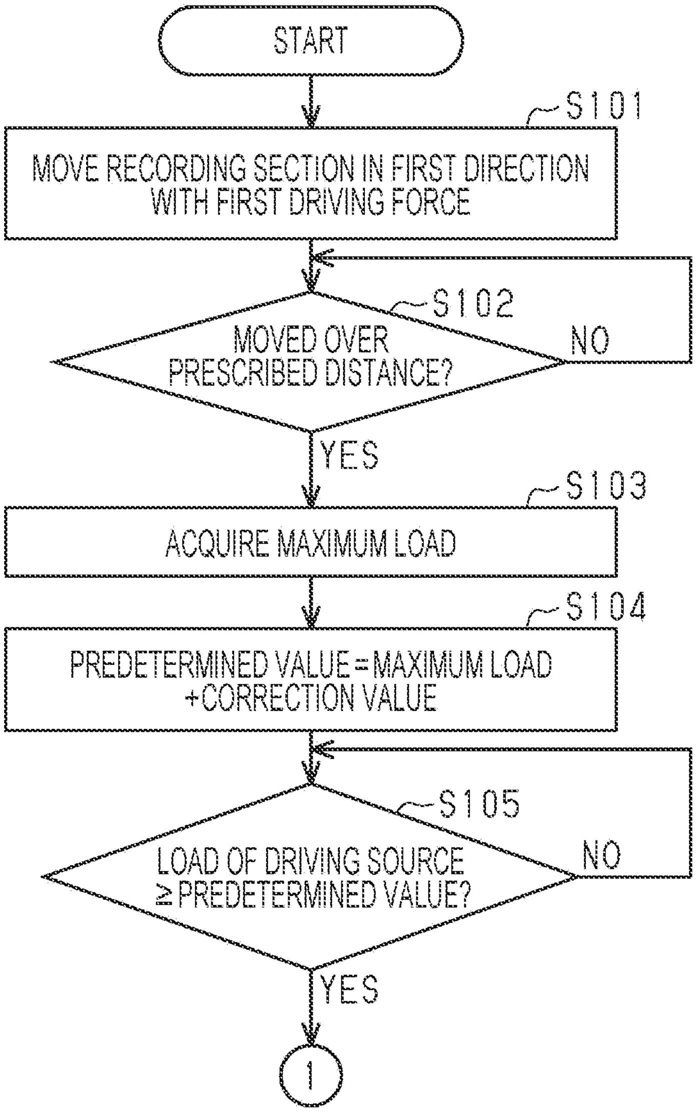
FIG. 5 is a flowchart indicating an adjustment routine.

In step S101, the controller 31 moves the recording section 19 from the separate position Ps in the first direction D1 with a first driving force, as illustrated in FIG. 5. In step S102, the controller 31 decides whether the recording section 19 has moved over a prescribed distance. The prescribed distance is shorter than the distance from the nozzle plane 35 positioned at the separate position Ps to the maintenance section 37 in the first direction D1. The prescribed distance may be preset. That is, even after the recording section 19 has moved over the prescribed distance, the recording section 19 has yet to reach the maintenance section 37.

When the recording section 19 has yet to move over the prescribed distance in step S102, the result in step S102 is NO, in which case the controller 31 waits until the recording section 19 moves over the prescribed distance. When the recording section 19 has moved over the prescribed distance, the result in step S102 becomes YES, in which case the controller 31 causes processing to proceed to step S103. Even after the recording section 19 has moved over the prescribed distance, the controller 31 continues to move the recording section 19 in the first direction D1.

In step S103, the controller 31 acquires the maximum load, of the driving source 44, exerted before the recording section 19 moves over the prescribed distance. In step S104, the controller 31 adds a correction value to the acquired maximum load to obtain a predetermined value. The correction value may be a preset constant or a variable that changes according to the maximum load or the like.

In step S105, the controller 31 decides whether the load of the driving source 44 has reached the predetermined value or more. When the load is less than the predetermined value, the result in step S105 is NO, in which case the controller 31 waits until the load reaches the predetermined value or more.

When the load reaches the predetermined value or more in step S105, the result in step S105 becomes YES, in which case the controller 31 causes processing to proceed to step S106.

Figure 6:
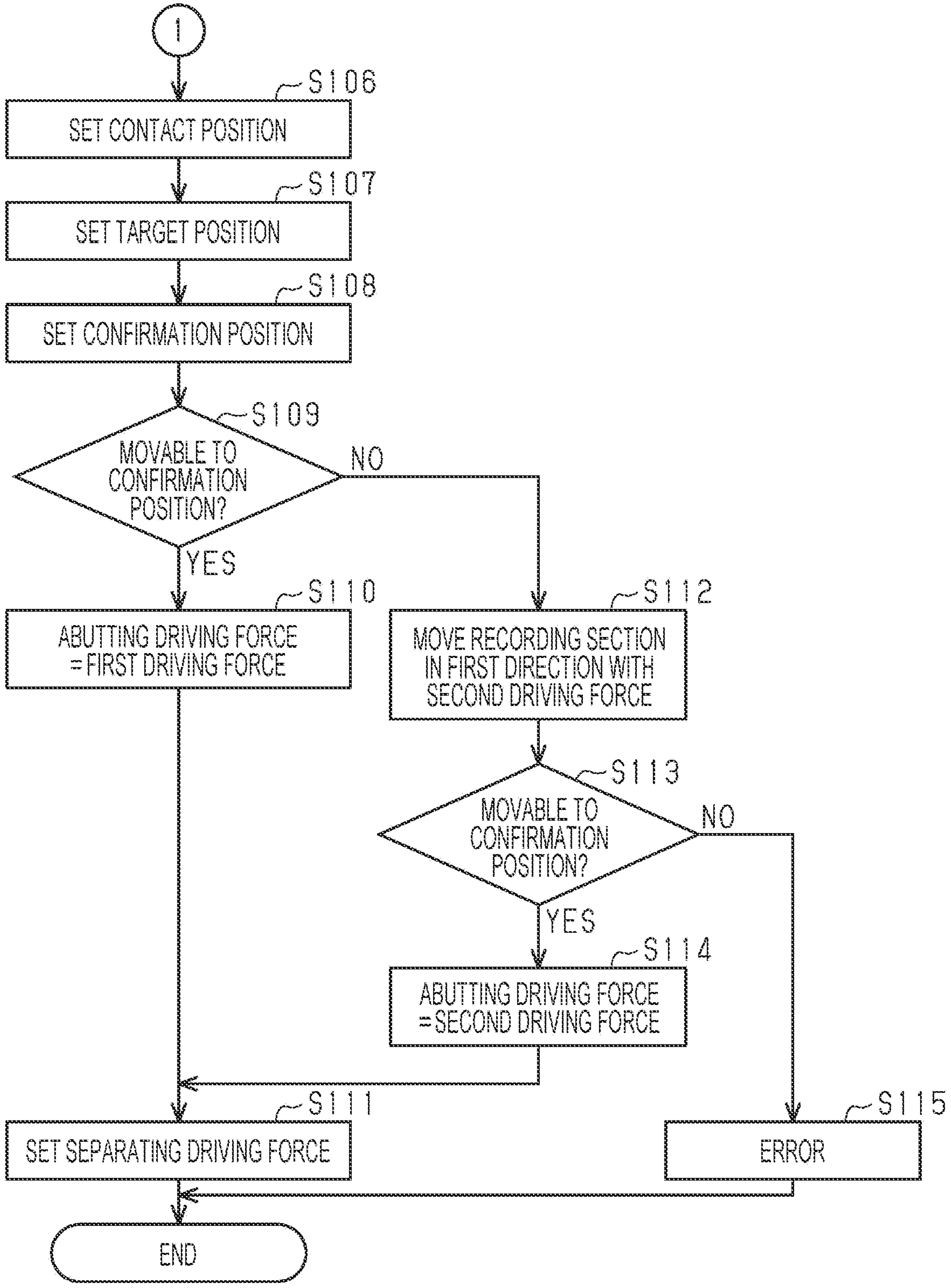
FIG. 6 is also a flowchart indicating the adjustment routine.

As illustrated in FIG. 6, the controller 31 sets a contact position in step S106. The contact position is the position of the recording section 19 when the load of the driving source 44 reaches the predetermined value. At the contact position, the recording section 19 starts to come into contact with the maintenance section 37.

In step S107, the controller 31 sets a target position. The target position is away from the contact position and toward the maintenance unit 20 by a first predetermined distance. In step S108, the controller 31 sets a confirmation position. The confirmation position is away from the target position by a second predetermined distance and toward the maintenance unit 20. The first predetermined distance and second predetermined distance may be the same value or may be different values. The sum of the first predetermined distance and second predetermined distance may be shorter than the distance from the position of the first projection portion 41 to the second projection portion 42 when the recording section 19 is positioned at the contact position.

In step S109, the controller 31 checks whether the recording section 19 intended to move with the first driving force in the first direction D1 can be moved to the confirmation position. When the recording section 19 can be moved to the confirmation position, the result in step S109 is YES, in which case the controller 31 causes processing to proceed to step S110.

In step S110, the controller 31 sets the abutting driving force as the first driving force. That is, when the recording section 19 can be moved to the target position by use of the driving force of the driving source 44 as the first driving force, the controller 31 sets the abutting driving force, which is a force with which the recording section 19 abuts the maintenance unit 20, as the first driving force.

In step S111, the controller 31 sets the separating driving force according to the abutting driving force set in step S110. Specifically, the controller 31 sets the separating driving force so as to be greater than the abutting driving force. That is, the first driving force set as the abutting driving force is smaller than the separating driving force, which is the driving force, of the driving source 44, with which the recording section 19 separates from the maintenance unit 20. For example, the controller 31 sets the separating driving force to 1.5 times the abutting driving force. Then, the controller 31 terminates the adjustment routine.

When the recording section 19 cannot be moved to the confirmation position in step S109, the result in step S109 is NO, in which case the controller 31 causes processing to proceed to step S112. In step S112, the controller 31 uses the driving force of the driving source 44 as the second driving force, which is greater than the first driving force, to move the recording section 19 in the first direction D1.

In step S113, the controller 31 checks whether the recording section 19 intended to move with the second driving force in the first direction D1 can be moved to the confirmation position. When the recording section 19 can be moved to the confirmation position, the result in step S113 is YES, in which case the controller 31 causes processing to proceed to step S114. In step S114, the controller 31 sets the abutting driving force as the second driving force. When the recording section 19 cannot be moved to the confirmation position with the first driving force but can be moved to the confirmation position with the second driving force, the controller 31 sets the abutting driving force, which is a force with which the recording section 19 abuts the maintenance unit 20, as the second driving force. Then, the controller 31 causes processing to proceed to step S111.

In step S111, the controller 31 sets the separating driving force so as to be greater than the abutting driving force set in step S114. For example, the controller 31 sets the separating driving force to 1.2 times the abutting driving force. The controller 31 may set the ratio of the separating driving force to the abutting driving force so that the greater the abutting driving force is, the smaller the ratio is. Then, the controller 31 terminates the adjustment routine.

When the recording section 19 cannot be moved to the confirmation position in step S113, the result in step S113 is NO, in which case the controller 31 causes processing to proceed to step S115. In step S115, the controller 31 makes a decision that indicates an error. When the recording section 19 cannot be moved to the confirmation position, the controller 31 may make a decision that indicates an error. Then, the controller 31 terminates the adjustment routine. When the controller 31 makes a decision that indicates an error, the controller 31 may make a notification before terminating adjustment routine.

Actions of the Embodiment

Actions of this embodiment will be described.

When setting the abutting driving force and separating driving force, the controller 31 moves the recording section 19 to the separate position Ps and moves the maintenance unit 20 to the maintenance position Pm.

The controller 31 moves the recording section 19 positioned at the separate position Ps in the first direction D1 with the first driving force. The controller 31 may set the predetermined value by adding a correction value to the maximum load exerted before the recording section 19 moves from the separate position Ps over the prescribed distance.

When the recording section 19 abuts the maintenance unit 20, the load of the driving source 44 is increased. The controller 31 may set, as the contact position, the position of the recording section 19 at a time when the load of the driving source 44 reaches the predetermined value. Specifically, the controller 31 acquires a first number of revolutions detected by the rotary encoder 48 from when the recording section 19 positioned at the separate position Ps starts to move until the load of the driving source 44 reaches the predetermined value. That is, the contact position is the position of the recording section 19 at a time when the rotary encoder 48 has rotated by the first number of revolutions, starting from a state in which the recording section 19 is positioned at the separate position Ps.

The controller 31 may set the target position and confirmation position according to the contact position. Specifically, the controller 31 sets a second number of revolutions in correspondence to the target position, and also sets a third number of revolutions in correspondence to the confirmation position.

The second number of revolutions is a value resulting from adding a first correction number of revolutions to the first number of revolutions. The first correction number of revolutions is the number of revolutions of the rotary encoder 48, the number of revolutions being required to move the recording section 19 by the first predetermined distance. When the rotary encoder 48 rotates by the second number of revolutions, starting from a state in which the recording section 19 is positioned at the separate position Ps, the position of the recording section 19 at that time is the target position.

The third number of revolutions is a value resulting from adding a second correction number of revolutions to the second number of revolutions. The second correction number of revolutions is the number of revolutions of the rotary encoder 48, the number of revolutions being required to move the recording section 19 by the second predetermined distance. When the rotary encoder 48 rotates by the third number of revolutions, starting from a state in which the recording section 19 is positioned at the separate position Ps, the position of the recording section 19 at that time is the confirmation position. When the rotary encoder 48 detects the third number of revolutions, the controller 31 decides that the recording section 19 can be moved to the confirmation position.

When the rotary encoder 48 detects the third number of revolutions while the controller 31 is driving the driving source 44 with the first driving force, the controller 31 may set the abutting driving force as the first driving force. When the rotary encoder 48 does not detect the third number of revolutions within a preset threshold time, the controller 31 may change the driving force of the driving source 44 to the second driving force. When the driving source 44 is driven with the second driving force and the rotary encoder 48 thereby detects the third number of revolutions, the controller 31 may set the abutting driving force as the second driving force. The controller 31 may set the separating driving force according to the abutting driving force set as the second driving force.

When performing capping for the recording section 19, the controller 31 moves the recording section 19 to the separate position Ps and also moves the maintenance unit 20 to the maintenance position Pm. In this case, the controller 31 moves the recording section 19 in the first direction D1 with the abutting driving force.

The controller 31 stops the recording section 19 at a position at a time when the rotary encoder 48 has rotated by the second number of revolutions. That is, the recording section 19 stops at the target position. With the recording section 19 at the target position, capping is reliably performed for the recording section 19 by the maintenance section 37.

When the controller 31 cancels capping for the recording section 19, the controller 31 moves the recording section 19 positioned at the target position in the second direction D2 with the separating driving force, which is greater than the abutting driving force. Specifically, the controller 31 moves the recording section 19 to the separate position Ps.

Effects of the Embodiment

Effects of this embodiment will be described.

1. A force with which the recording section 19 and maintenance unit 20 abut each other is smaller than a force with which the recording section 19 and maintenance unit 20 separate from each other. Therefore, even when the worm gear 45 is jammed during abutting between the recording section 19 and the maintenance unit 20, the recording section 19 and maintenance unit 20 can be separated from each other. This can reduce the fear that the recording section 19 and maintenance unit 20 cannot be separated from each other.
2. A torque with which the recording section 19 and maintenance unit 20 abut each other is smaller than a torque with which the recording section 19 and maintenance unit 20 separate from each other. That is, by adjusting the magnitude of the torque, forces with which the recording section 19 and maintenance unit 20 abut each other and separate from each other can be easily adjusted.
3. The value of a current, in the driving source 44, with which the recording section 19 and maintenance unit 20 abut each other is smaller than the value of a current, in the driving source 44, with which the recording section 19 and maintenance unit 20 separate from each other. That is, by adjusting the value of the current in the driving source 44, forces with which the recording section 19 and maintenance unit 20 abut each other and separate from each other can be easily adjusted.
4. The controller 31 sets forces with which the recording section 19 and maintenance unit 20 abut each other and separate from each other. Therefore, the forces can be more easily adjusted than when, for example, a mechanism such as, for examples, gears is used to adjust the forces.
5. The controller 31 sets the value of a current, in the driving source 44, with which the recording section 19 and maintenance unit 20 abut each other so as to be smaller than the value of a current, in the driving source 44, with which the recording section 19 and maintenance unit 20 separate from each other. That is, when the controller 31 adjusts the value of the current in the driving source 44, forces with which the recording section 19 and maintenance unit 20 abut each other and separate from each other can be easily adjusted.
6. The urging section 38 urges the maintenance section 37 toward the nozzle section 33. Therefore, by having the recording section 19 and maintenance unit 20 come close to each other, the maintenance section 37 can be easily pressed against the nozzle section 33.
7. When the recording section 19 and maintenance unit 20 abut each other, the load of the driving source 44 is increased. The controller 31 causes the recording section 19 and maintenance unit 20 to come close to each other until the load of the driving source 44 reaches a predetermined value. This makes it easy to detect a position at which the recording section 19 and maintenance unit 20 abut each other.
8. The controller 31 sets a target position. The target position is a position at which the recording section 19 and maintenance unit 20 come close to each other by a first predetermined distance after the load of the driving source 44 has reached the predetermined value. This can increase pressure under which the recording section 19 and maintenance unit 20 abut each other.
9. The controller 31 causes the recording section 19 and maintenance unit 20 abut each other with a first driving force with which one of the recording section 19 and maintenance unit 20 can be moved to the target position. This makes it possible for the recording section 19 and maintenance unit 20 to abut each other at the target position.
10. The controller 31 causes the recording section 19 and maintenance unit 20 to abut each other with the first driving force with which one of the recording section 19 and maintenance unit 20 can be moved to a confirmation position. The confirmation position is away from the target position by a second predetermined distance and toward the other of the recording section 19 and maintenance unit 20. Therefore, one of the recording section 19 and maintenance unit 20 can be moved with a force enough to cause the recording section 19 and maintenance unit 20 to abut each other at the target position.
11. At a predetermined timing, the controller 31 sets a force with which the recording section 19 and maintenance section 37 abut each other. That is, the force with which the recording section 19 and maintenance section 37 abut each other can be automatically set. This can improve usability.

12. When one of the recording section 19 and maintenance unit 20 cannot be moved to the confirmation position, a decision indicating an error is made. Therefore, even when a problem occurs in, for example, the assembly of parts, the problem can be easily found.
13. When one of the recording section 19 and maintenance unit 20 cannot be moved to the confirmation position with the first driving force but can be moved to the confirmation position with the second driving force, the controller 31 causes the recording section 19 and maintenance unit 20 to abut each other with the second driving force. This makes it possible to automatically adjust the force with which the recording section 19 and maintenance unit 20 abut each other.
14. The controller 31 confirms that the recording section 19 can be moved to the target position. This can reduce the fear that a position to which the recording section 19 cannot be moved is set as the target position.
15. The controller 31 sets the driving force with which the recording section 19 has moved to the target position or confirmation position as the force with which the recording section 19 abuts the maintenance unit 20. This can reduce the fear that the recording section 19 cannot be moved to the target position.
16. There is the fear that when a photosensor is used to detect the position of the recording section 19, the photosensor becomes dirty due to mist, which is scattered liquid, and the position cannot thereby be detected. However, since the position of the recording section 19 can be detected by use of the rotary encoder 48 and the load of the driving source 44, the influence of mist can be reduced.
17. The controller 31 executes an adjustment routine at a predetermined timing. Therefore, the driving source 44 and the like can be made more durable than when, for example, the adjustment routine is executed before each time capping is performed.
18. The controller 31 confirms that the recording section 19 can be moved to the target position or confirmation position, starting from a small driving force. Therefore, power consumption can be reduced unlike when the confirmation starts from a large driving force.
19. The controller 31 sets the predetermined value according to an actual condition such as the load during a period in which the recording section 19 is moved from the separate position Ps by a prescribed distance. When this setting is used, the contact position can be appropriately detected.

Variation

The above embodiment can be modified and practiced as described below. The above embodiment and the variation described below can be combined within a range in which any mutual contradiction does not occur from a technical viewpoint.

The predetermined value may be a preset constant. The predetermined value may be a value greater than a load under which the recording section 19 moves without being brought into contact with the maintenance unit 20. For example, the predetermined value may be experimentally preset. When the predetermined value is preset, steps S102 to S104 may be omitted in the adjustment routine in FIGS. 5 and 6.

When performing capping for the recording section 19, the controller 31 may stop the recording section 19 at a position at a time when the rotary encoder 48 is rotated by the first correction number of revolutions after the load of the driving source 44 reaches the predetermined value. That is, when the load of the driving source 44 reaches the predetermined value, the controller 31 may decide that the recording section 19 has moved to the contact position. To position the recording section 19 at the target position, the controller 31 may stop the recording section 19 at the position away from the contact position by the first predetermined value, according to the result of the detection by the rotary encoder 48.

The second moving section 22 may function as a moving section. The second moving section 22 may have the driving source 44 and worm gear 45. In abutting between the recording section 19 and the maintenance unit 20 and their separation, the second moving section 22 may cause the maintenance unit 20 to abut the recording section 19 and may separate the maintenance unit 20 from the recording section 19. The second moving section 22 may move the maintenance unit 20 positioned at the maintenance position Pm in the second direction D2 to cause the maintenance unit 20 to abut the recording section 19. When the maintenance unit 20 performs capping for the recording section 19, the second moving section 22 may move the maintenance unit 20 in the first direction D1 to separate the maintenance unit 20 from the recording section 19. In this case, the restricting section 21 can suppress the movement of the maintenance unit 20 toward the recording section 19. The force with which the driving source 44 causes the maintenance unit 20 to abut the recording section 19 is smaller than the force with which the driving source 44 separates the maintenance unit 20 from the recording section 19.

The torque with which the driving source 44 causes the maintenance unit 20 to abut the recording section 19 may be smaller than the torque with which the driving source 44 separates the maintenance unit 20 from the recording section 19.

The controller 31 may set the torque with which the maintenance unit 20 abuts the recording section 19. The controller 31 may set the torque with which the maintenance unit 20 separates from the recording section 19. The torque with which the maintenance unit 20 separates from the recording section 19 may be greater than the torque with which the maintenance unit 20 abuts the recording section 19.

The value of the current, in the driving source 44, with which the driving source 44 causes the maintenance unit 20 to abut the recording section 19 may be smaller than the value of the current, in the driving source 44, with which the driving source 44 separates the maintenance unit 20 from the recording section 19.

The controller 31 may set the force with which the driving source 44 causes the maintenance unit 20 to abut the recording section 19 so that the force is smaller than the force with which the driving source 44 separates the maintenance unit 20 from the recording section 19.

The controller 31 may set the value of the current, in the driving source 44, with which the driving source 44 causes the maintenance unit 20 to abut the recording section 19 so that the value is smaller than the value of the current, in the driving source 44, with which the driving source 44 separates the maintenance unit 20 from the recording section 19.

The controller 31 may move the maintenance unit 20 in the second direction D2, in which the maintenance unit 20 comes close to the recording section 19, until the load of the driving source 44 reaches the predetermined value.

The controller 31 may set, as the contact position, the position of the maintenance unit 20 at a time when the load of the driving source 44 reaches the predetermined value, and may set, as the target position, a position away from the contact position and toward the recording section 19 by the first predetermined distance.

When the maintenance unit 20 can be moved to the target position by use of the driving force of the driving source 44 as the first driving force, the controller 31 may set, as the first driving force, the force with which the maintenance unit 20 abuts the recording section 19.

The controller 31 may set, as the confirmation position, the position of the maintenance unit 20 away from the target position by the second predetermined distance and toward the recording section 19. When the maintenance unit 20 can be moved to the confirmation position by use of the driving force of the driving source 44 as the first driving force, the controller 31 may set, as the first driving force, the force with which the maintenance unit 20 abuts the recording section 19.

At a predetermined timing, the controller 31 may set the force with which the maintenance unit 20 abuts the recording section 19.

When the maintenance unit 20 cannot be moved to the confirmation position, the controller 31 may make a decision that indicates an error.

When the maintenance unit 20 cannot be moved to the confirmation position with the first driving force but can be moved to the confirmation position with the second driving force, the controller 31 may set, as the second driving force, the force with which the maintenance unit 20 abuts the recording section 19.

When the recording section 19 or maintenance unit 20 cannot be moved to the confirmation position with the first driving force, the controller 31 may make a decision that indicates an error. When the controller 31 makes a decision that indicates an error, the controller 31 may notify a notification section (not illustrated) of the error. When the controller 31 makes a decision that indicates an error, the controller 31 may send information indicating the error to an external device.

The controller 31 may preset the force with which the recording section 19 and maintenance unit 20 abut each other.

When the recording section 19 or maintenance unit 20 can be moved to the target position by use of the driving force of the driving source 44 as the first driving force, the controller 31 may set, as the first driving force, the force with which the recording section 19 and maintenance unit 20 abut each other.

The controller 31 may not set at least one of the contact position, target position, and confirmation position.

The first moving section 18 and second moving section 22 may function as a moving section. In abutting between the recording section 19 and the maintenance unit 20 and in their separation, both of them may move.

The restricting section 21 may be structured so as to have only one of the first projection portion 41 and second projection portion 42. The first projection portion 41 may abut, for example, a flat surface of the maintenance unit 20 so that the restricting section 21 suppresses the movement of the recording section 19 and maintenance unit 20 when The restricting section 21 may suppress of the movement of the recording section 19 and maintenance unit 20 by causing the second projection portion 42 to abut, for example, a flat surface of the recording section 19.

At least one of the first projection portion 41 and second projection portion 42 may be elastic.

When one of the first projection portion 41 and second projection portion 42 is pressed against the other of the first projection portion 41 and second projection portion 42 by a predetermined amount after the first projection portion 41 and second projection portion 42 are brought into contact with each other, the restricting section 21 may suppress the movement of the recording section 19 or maintenance unit 20.

The forces with which the recording section 19 and maintenance unit 20 abut each other and separate from each other may be changed by a mechanism other than the controller 31.

The recording device 11 may have a plurality of transmission mechanism that output different torques. A first transmission mechanism may transmit, to the recording section 19, the driving force of the driving source 44 when it is driven in a normal direction. The recording section 19 and maintenance section 37 may abut each other with the driving force transmitted from the first transmission mechanism. A second transmission mechanism may transmit, to the recording section 19, the driving force of the driving source 44 when it is driven in a reverse direction. The recording section 19 and maintenance section 37 may be separated from each other with the driving force transmitted from the second transmission mechanism. The torque of the first transmission mechanism is lower than the torque of the second transmission mechanism.

The recording device 11 may have a plurality of driving sources 44 that produce different torques. The torque of the first driving source is lower than the torque of the second driving source. The first driving source may cause the recording section 19 and maintenance unit 20 to abut each other. The second driving source may separate the recording section 19 and maintenance unit 20 from each other.

The recording device may be a liquid ejecting apparatus that ejects or discharges a liquid other than ink for recoding purposes. States of the liquid discharged from the liquid ejecting apparatus in the form of droplets in a very small amount include a granular state, a tear-like state, and a state tailing like a string. The liquid referred to here only needs to be a material that the liquid ejecting apparatus can eject. For example, the liquid may only need to be a material in a state in which the substance is in a liquid phase. Therefore, liquids include materials in a liquid state that have high viscosity or low viscosity and other materials in a fluid state such as inorganic solvents such as sols, gel water, and the like, organic solvents, solutions, liquid resins, metals in a liquid state, and metallic melts. Liquids also include not only liquids, which are in one state of substances, but also solvents in which particles of a functional material composed of pigments, metal particles, or another solid are dissolved, dispersed, or mixed. Typical examples of liquids include liquid crystals and inks described in the above embodiment. Inks referred to here include ordinary water-based inks and oil-based inks as well as various other types of liquid compositions such as gel inks and hot melt inks.

Specific examples of the liquid ejecting apparatus include, for example, apparatuses that eject a liquid in which a material, such as an electrode material or a color material, used in, for example, the manufacturing of a liquid crystal display, an electroluminescence display, or a field emission display, is dispersed or dissolved. The liquid ejecting apparatus may be an apparatus that ejects a bio-organic substance used in the manufacturing of biochips, an apparatus that ejects a liquid as a sample used as precise pipettes, a printer, a microdispenser, or the like. Alternatively, the liquid ejecting apparatus may be an apparatus that ejects a lubricant to a clock, a camera, or another precision machine at a particular point or an apparatus that ejects a transparent resin liquid such as an ultraviolet curable resin liquid to a substrate to form a minute hemispherical lens, an optical lens, or the like used in an optical communication element or the like. Alternatively, the liquid ejecting apparatus may be an apparatus that ejects an acidic or alkaline etching liquid to etch a substrate or the like.

Definition

The expression "at least one" used in this description means "at least one" of intended choices. In an example in which there are two choices, the expression "at least one" used in this description means "only one choice" or "both of the two choices". In another example in which there are three or more choices, the expression "at least one" used in this description means that "only one choice" or "a combination of two or more arbitrary choices".

Notes

The technical concept comprehended from the embodiment and variation described above as well as effects of the technical concept will be described below.

A. A recording device has: a recording section that discharges a liquid to a medium for recording purposes; a maintenance unit that abuts the recording section and performs maintenance of the recording section; a moving section that causes one of the recording section and the maintenance unit to abut the other of the recording section and the maintenance unit and separates the one from the other; and a restricting section that can suppress movement of the one toward the other after the recording section and the maintenance unit abut each other. The moving section has a driving source and a worm gear that transmits the power of the driving source. A force with which the driving source causes the one to abut the other is smaller than a force with which the driving source separates the one from the other.

In this structure, a force with which the recording section and maintenance unit abut each other is smaller than a force with which the recording section and maintenance unit separate from each other. Therefore, even when the worm gear is jammed during abutting between the recording section and the maintenance unit, the recording section and maintenance unit can be separated from each other. This can reduce the fear that the recording section and maintenance unit cannot be separated from each other.

B. In the recording device, a torque with which the driving source causes the one to abut the other may be smaller than a torque with which the driving source separates the one from the other.

In this structure, a torque with which the recording section and maintenance unit abut each other is smaller than a torque with which the recording section and maintenance unit separate from each other. That is, by adjusting the magnitude of the torque, forces with which the recording section and maintenance unit abut each other and separate from each other can be easily adjusted.

C. In the recording device, the value of a current, in the driving source, with which the driving source causes the one to abut the other may be smaller than the value of a current, in the driving source, with which the driving source separates the one from the other.

In this structure, the value of a current, in the driving source, with which the recording section and maintenance unit abut each other is smaller than the value of a current, in the driving source, with which the recording section and maintenance unit separate from each other. That is, by adjusting the magnitude of the value of the current in the driving source, forces with which the recording section and maintenance unit abut each other and separate from each other can be easily adjusted.

D. The recording device may further have a controller that controls the moving section. The controller may set the force with which the driving source causes the one to abut the other so as to be smaller than the force with which the driving source separates the one from the other.

In this structure, the controller sets forces with which the recording section and maintenance unit abut each other and separate from each other. Therefore, the forces can be more easily adjusted than when, for example, a mechanism such as, for example, gears is used to adjust the forces.

E. In the recording device, the controller may set the value of a current, in the driving source, with which the driving source causes the one to abut the other so as to be smaller than the value of a current, in the driving source, with which the driving source separates the one from the other.

In this structure, the controller sets the value of a current, in the driving source, with which the recording section and maintenance unit abut each other so as to be smaller than the value of a current, in the driving source, with which the recording section and maintenance unit separate from each other. That is, when the controller adjusts the values of the currents in the driving source, forces with which the recording section and maintenance unit abut each other and separate from each other can be easily adjusted.

F. In the recording device, the recording section may have a nozzle section, from which a liquid is discharged; and the maintenance unit may have a maintenance section that performs maintenance of the nozzle section and may also have an urging section that urges the maintenance section toward the nozzle section.

In this structure, the urging section urges the maintenance section toward the nozzle section. Therefore, by having the recording section and maintenance unit come close to each other, the maintenance section can be easily pressed against the nozzle section.

G. In the recording device, the recording section may have a nozzle section, from which a liquid is discharged; the maintenance unit may have a maintenance section that performs maintenance of the nozzle section and may also have an urging section that urges the maintenance section toward the nozzle section; and the controller may move the one in a direction toward the other until the load of the driving source reaches a predetermined value.

When the recording section and maintenance unit abut each other, the load of the driving source is increased. In this structure, the controller causes the recording section and maintenance unit to come close to each other until the load of the driving source reaches the predetermined value. This makes it easy to detect a position at which the recording section and maintenance unit abut each other.

H. In the recording device, the controller may set, as a contact position, the position of the one at a time when the load of the driving source reaches the predetermined value, and may set, as a target position, a position away from the contact position and toward the other by a first predetermined distance.

In this structure, the controller sets a target position. The target position is a position at which the recording section and maintenance unit come close to each other by a first predetermined distance after the load of the driving source has reached the predetermined value. This can increase pressure under which the recording section and maintenance unit abut each other.

I. In the recording device, when the one can be moved to the target position by use of the driving force of the driving source as a first driving force, the controller may set, as the first driving force, the force with which the one abuts the other.

In this structure, the controller uses a first driving force, with which one of the recording section and maintenance unit can be moved to the target position, to cause the recording section and maintenance unit to abut each other. This makes it possible for the recording section and maintenance unit to abut each other at the target position.

J. In the recording device, when the one can be moved to a confirmation position, which is away from the target position by a second predetermined distance and toward the other, by use of the driving force of the driving source as the first driving force, the controller may set, as the first driving force, the force with which the one abuts the other.

In this structure, the controller uses the first driving force, with which one of the recording section and maintenance unit can be moved to a confirmation position, to cause the recording section and maintenance unit to abut each other. The confirmation position is away from the target position by a second predetermined distance and toward the other. Therefore, one of the recording section and maintenance unit can be moved with a force enough to cause the recording section and maintenance unit to abut each other at the target position.

K. In the recording device, the controller may set the force with which the one abuts the other at a predetermined timing.

In this structure, the controller sets the force with which the recording section and maintenance section abut each other at a predetermined timing. That is, the force with which the recording section and maintenance section abut each other can be automatically set. This can improve usability.

L. In the recording device, when the one cannot be moved to the confirmation position, the controller may make a decision that indicates an error.

In this structure, when one of the recording section and maintenance unit cannot be moved to the confirmation position, a decision indicating an error is made. Therefore, even when a problem occurs in, for example, the assembly of parts, the problem can be easily found.

M. In the recording device, when the one cannot be moved to the confirmation position with the first driving force but can be moved to the confirmation position by use of the driving force of the driving source as a second driving force, which is greater than the first driving force, the controller may set, as the second driving force, the force with which the one abuts the other.

In this structure, when one of the recording section and maintenance unit cannot be moved to the confirmation position with the first driving force but can be moved to the confirmation position with a second driving force, the controller causes the recording section and maintenance unit to abut each other with the second driving force. This makes it possible to automatically adjust the force with which the recording section and maintenance unit abut each other.

N. A method of controlling a recording device that has a recording section that discharges a liquid to a medium for recording purposes, a maintenance unit that abuts the recording section and performs maintenance of the recording section, a moving section that causes one of the recording section and the maintenance unit to abut the other of the recording section and the maintenance unit and separates the one from the other, and a restricting section that can suppress movement of the one toward the other after the recording section and the maintenance unit abut each other, the moving section having a driving source and a worm gear that transmits the power of the driving source, the recording section having a nozzle section, from which a liquid is discharged, the maintenance unit having a maintenance section that performs maintenance of the nozzle section and also having an urging section that urges the maintenance section toward the nozzle section, the method including: moving the one in a direction toward the other until the load of the driving source reaches a predetermined value; setting, as a contact position, the position of the one at a time when the load of the driving source reaches the predetermined value; and setting, as a target position, a position away from the contact position and toward the other by a first predetermined distance; and setting, as a first driving force, the force with which the one abuts the other, when the one can be moved to a confirmation position, which is away from the target position by a second predetermined distance and toward the other, by use of, as the first driving force, the driving force of the driving source. The first driving force is smaller than the driving force, of the driving source, with which the one separates from the other. In this method, effects similar to those in the recording unit described above can be obtained.

O. In the method of controlling a recording device, when the one cannot be moved to the confirmation position with the first driving force but can be moved to the confirmation position by use of the driving force of the driving source as a second driving force, which is greater than the first driving force, the force with which the one abuts the other may be set as the second driving force. In this method, effects similar to those in the recording unit described above can be obtained.

P. The method of controlling a recording device, further including setting the driving force, of the driving source, with which the one separates from the other. The driving force, of the driving source, with which the one separates from the other may be greater than the driving force, of the driving source, with which the one abuts the other. In this method, effects similar to those in the recording unit described above can be obtained.

Q. A recording device has: a recording section that discharges a liquid to a medium for recording purposes; a maintenance unit that abuts the recording section and performs maintenance of the recording section; and a moving section that causes one of the recording section and the maintenance unit to abut the other of the recording section and the maintenance unit and separates the one from the other. The moving section has a driving source and a worm gear that transmits the power of the driving source. A force with which the driving source causes the one to abut the other is smaller than a force with which the driving source separates the one from the other.

The cap unit in JP-A-2011-73229 forms a sealed space that covers a discharging port, which is an example of a nozzle, when the cap comes into contact with the head. When the force with which the recording section and maintenance unit abut each other is small, the space that covers the nozzle cannot be adequately sealed. However, when the force with which the recording section and maintenance unit abut each other is too great, a jam may occur between the worm and the worm wheel. In view of this, the force with which the recording section and maintenance unit abut each other is smaller than the force with which the recording section and maintenance unit separate from each other. Therefore, even when the worm gear is jammed during abutting between the recording section and the maintenance unit, the recording section and maintenance unit can be separated from each other. This can reduce the fear that the recording section and maintenance unit cannot be separated from each other.

What is claimed is:

1. A recording device comprising:

a recording section that discharges a liquid to a medium for recording purposes;

a maintenance unit that abuts the recording section and performs maintenance of the recording section;

a moving section that causes one of the recording section and the maintenance unit to abut another of the recording section and the maintenance unit and separates the one of the recording section and the maintenance unit from the another of the recording section and the maintenance unit;

a restricting section provided on at least one of the recording section and the maintenance unit and configured to suppress movement of the one of the recording section and the maintenance unit toward the another of the recording section and the maintenance unit by contacting with the one or the another of the recording section and the maintenance unit after the recording section and the maintenance unit mutually abut; and a controller that controls the moving section, wherein the moving section has a driving source, and a worm gear that transmits power of the driving source, the driving source drives in a first direction with a first driving force so that the one of the recording section and the maintenance unit abuts the another of the recording section and the maintenance unit, and drives in a second direction opposite to the first direction with a second driving force and with which so that the one of the recording section and the maintenance unit separates from the another of the recording section and the maintenance unit, the controller sets the first force with which the driving source causes the one of the recording section and the maintenance unit to abut the another of the recording section and the maintenance unit so as to be smaller than the second force with which the driving source separates the one of the recording section and the maintenance unit from the another of the recording section and the maintenance unit, the controller moves the one of the recording section and the maintenance unit in a direction toward the another of the recording section and the maintenance unit until a load of the driving source reaches a predetermined value, the controller sets a first position of the one of the recording section and the maintenance unit at a time when the load of the driving source reaches the predetermined value, as a contact position, and a second position the one of the recording section and the maintenance unit away from the contact position and toward the another of the recording section and the maintenance unit by a first predetermined distance, as a target position, and when the one of the recording section and the maintenance unit is not able to move to a confirmation position, which is away from the target position by a second predetermined distance and toward the another of the recording section and the maintenance unit, with the first driving force but is able to move to the confirmation position by use of a third driving force of the driving source, which is greater than the first driving force, the controller sets, as the third driving force, the force with which the one of the recording section and the maintenance unit abuts the another of the recording section and the maintenance unit.

2. The recording device according to claim 1, wherein a torque with which the driving source causes the one of the recording section and the maintenance unit to abut the another of the recording section and the maintenance unit is smaller than a torque with which the driving source separates the one of the recording section and the maintenance unit from the another of the recording section and the maintenance unit.

3. The recording device according to claim 1, wherein a value of a current, in the driving source, with which the driving source causes the one of the recording section and the maintenance unit to abut the another of the recording section and the maintenance unit is smaller than a value of a current, in the driving source, with which the driving source separates the one of the recording section and the maintenance unit from the another of the recording section and the maintenance unit.

4. The recording device according to claim 1, wherein the controller sets a value of a current, in the driving source, with which the driving source causes the one of the recording section and the maintenance unit to abut the another of the recording section and the maintenance unit so as to be smaller than a value of a current, in the driving source, with which the driving source separates the one of the recording section and the maintenance unit from the another of the recording section and the maintenance unit.

5. The recording device according to claim 1, wherein:

the recording section has a nozzle section, from which a liquid is discharged; and the maintenance unit has a maintenance section that performs maintenance of the nozzle section, and an urging section that urges the maintenance section toward the nozzle section.

6. The recording device according to claim 1, wherein:

the recording section has a nozzle section, from which a liquid is discharged, and the maintenance unit has a maintenance section that performs maintenance of the nozzle section, and an urging section that urges the maintenance section toward the nozzle section.

7. The recording device according to claim 1, wherein when the one of the recording section and the maintenance unit is able to move to the target position by use of the first driving force, the controller sets, as the first driving force, the force with which the one abuts the another of the recording section and the maintenance unit.

8. The recording device according to claim 1, wherein when the one of the recording section and the maintenance unit is able to move to the confirmation position by use of the first driving force, the controller sets, as the first driving force, the force with which the one of the recording section and the maintenance unit abuts the another of the recording section and the maintenance unit.

9. The recording device according to claim 7, wherein the controller sets the first force with which the one of the recording section and the maintenance unit abuts the another of the recording section and the maintenance unit at a predetermined timing.

10. The recording device according to claim 8, wherein when the one of the recording section and the maintenance unit is not able to move to the confirmation position, the controller makes a decision that indicates an error.

* * * * *